United States Patent [19]

Berkoff et al.

[11] 4,369,585
[45] Jan. 25, 1983

[54] WET AND DRY ROASTING APPARATUS AND PROCESS FOR NUT, BEAN AND SEED-LIKE PRODUCT

[75] Inventors: William Berkoff, 6143 W. Olympic Blvd., Los Angeles, Calif. 90048; Walter O. Martens, Los Angeles, Calif.

[73] Assignee: William Berkoff, Los Angeles, Calif.

[21] Appl. No.: 214,184

[22] Filed: Dec. 8, 1980

[51] Int. Cl.³ ............................................. F26B 11/04
[52] U.S. Cl. ......................................... 34/63; 34/126; 34/187; 34/56; 99/470; 99/479; 426/466; 432/141; 432/239
[58] Field of Search ....................... 426/466, 443, 469; 34/126, 5, 56, 62, 63, 187, 184; 62/346; 99/470, 479, 483; 432/81, 105, 130, 141, 239

[56] References Cited

U.S. PATENT DOCUMENTS

| | | | |
|---|---|---|---|
| 794,085 | 7/1905 | Dubois | 34/126 |
| 3,290,791 | 12/1966 | Keaton | 34/62 |
| 3,333,367 | 8/1967 | Salvaire | 62/346 |
| 3,942,644 | 3/1976 | Vissers | 34/62 |

FOREIGN PATENT DOCUMENTS

| | | | |
|---|---|---|---|
| 1589 | of 1861 | United Kingdom | 34/126 |
| 378331 | 8/1932 | United Kingdom | 34/126 |

Primary Examiner—Larry I. Schwartz
Attorney, Agent, or Firm—Thomas A. Turner, Jr.

[57] ABSTRACT

A plurality of rotatable containers has perforations for draining treated and untreated liquids while retaining nut product initially received therein either in a liquid slurry or dry. A closed, controllable oven environment, encloses said containers and has means for alternately evacuating liquids and nut products gravitationally from the containers to different locations, respectively to roast, dry, cool and dehydrate the nut product. Environmental temperature control for not only the oven but also cooling bins, controls heating and cooling to within certain ranges, and includes air percolation through drained and collected nut product. A process for preparing nut, bean and seed-like products is described for roasting, drying, dehydrating and cooling the products. The process includes a soaking of the product in a liquid solution at selected temperatures, agitation of the solution, draining of the liquids and maintenance of predetermined temperature in a closed environment. Subsequently, the temperature is adjusted in stages to dry, cool and ultimately dehydrate the product, and to further prepare the product in a way to prevent overburning, overcooking and the development of bacteria.

10 Claims, 14 Drawing Figures

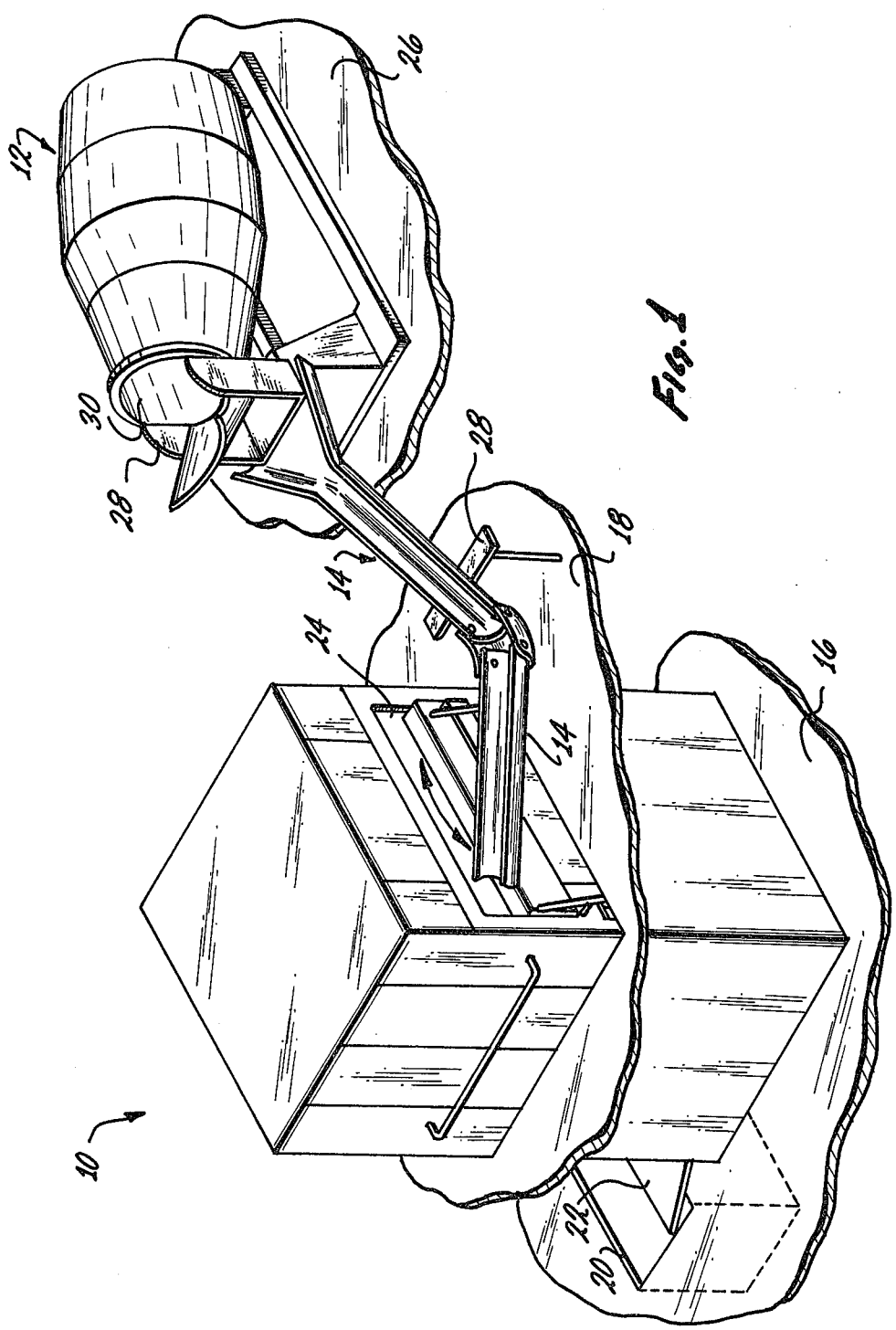

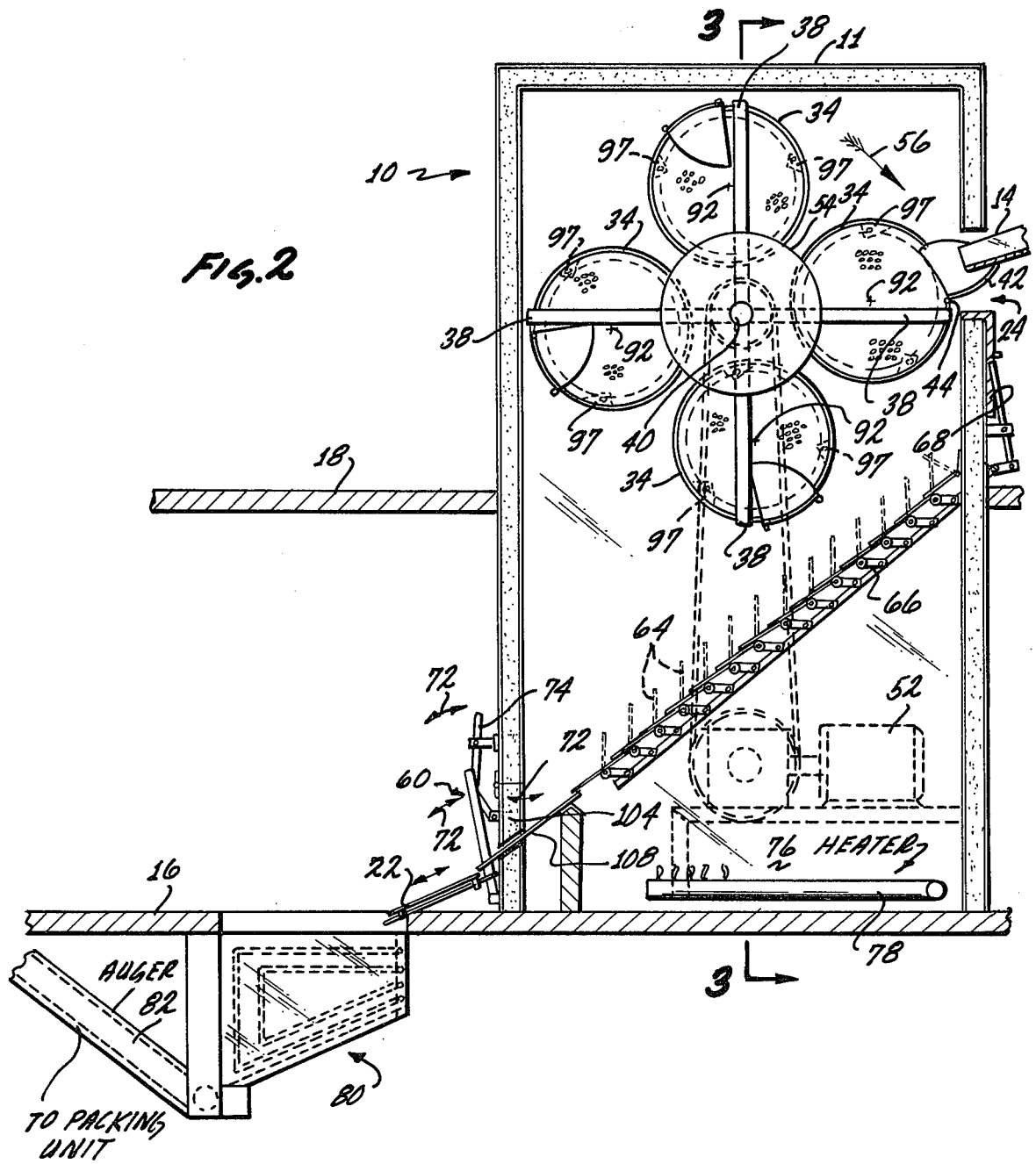

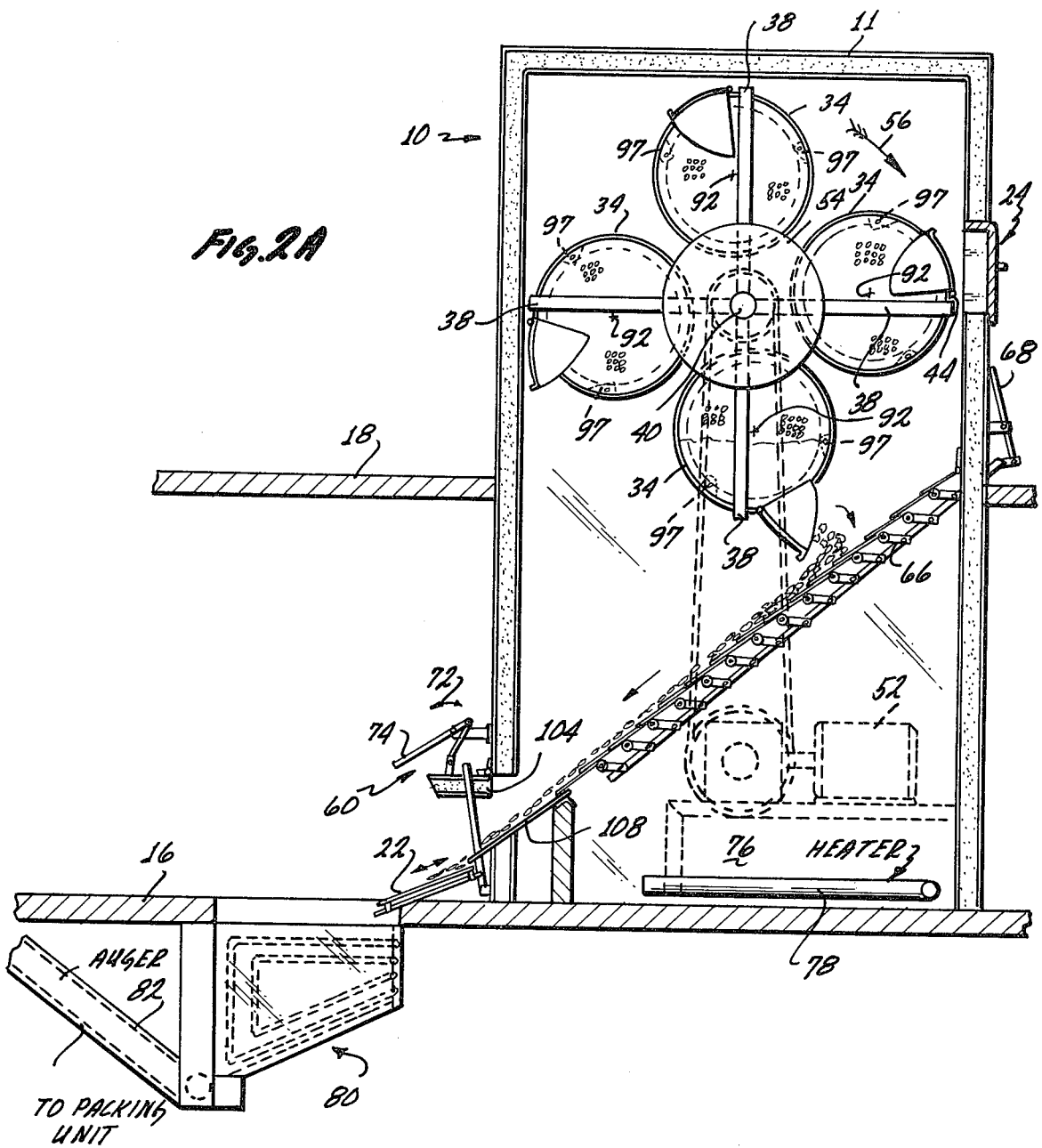

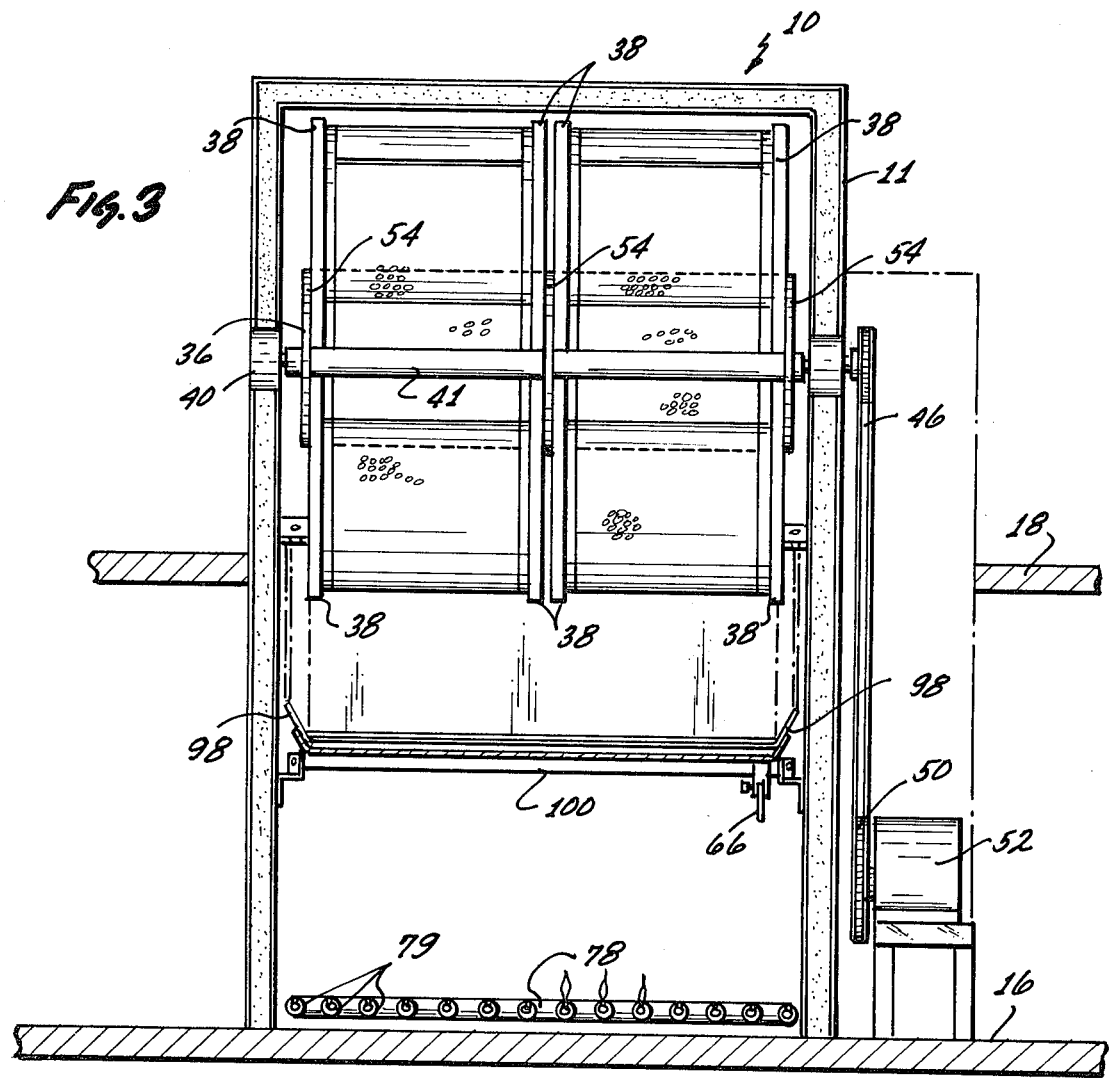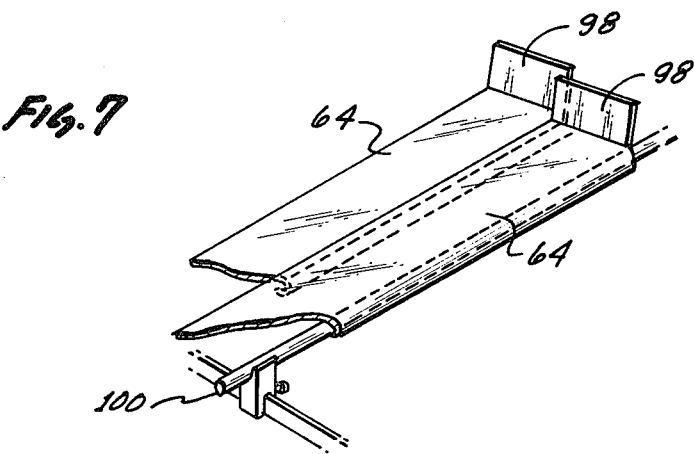

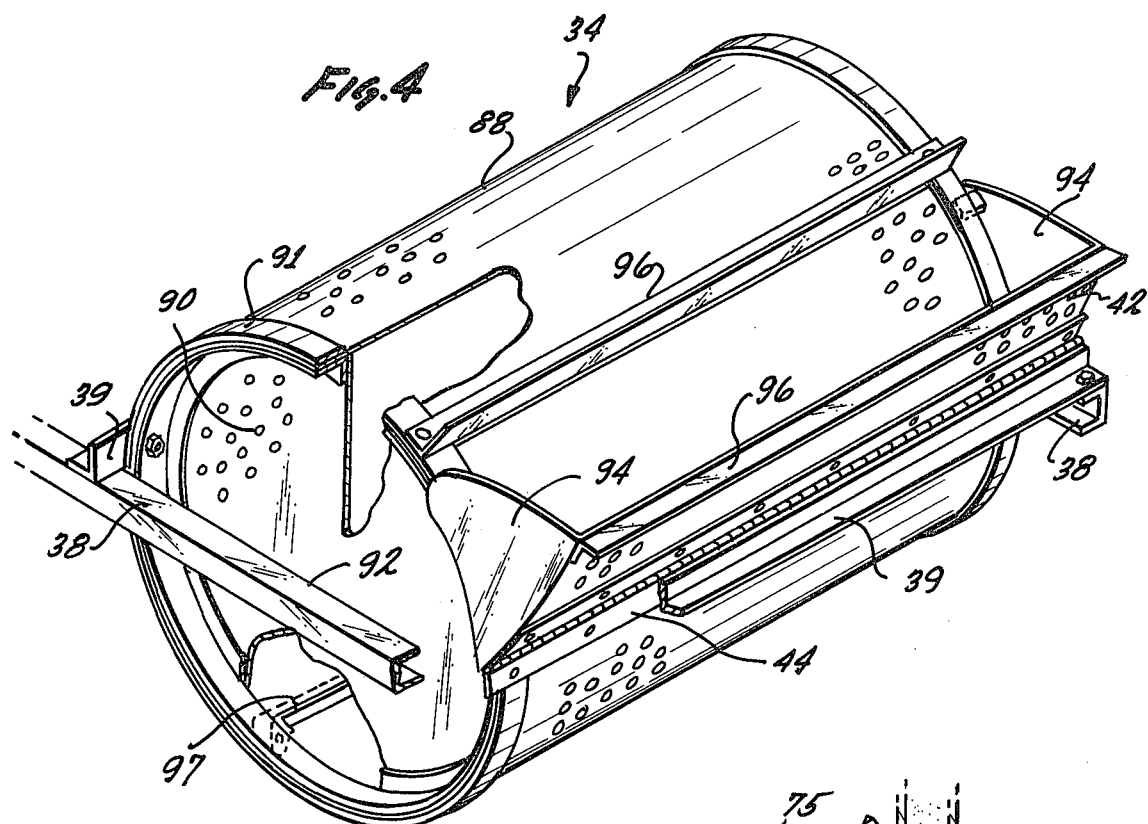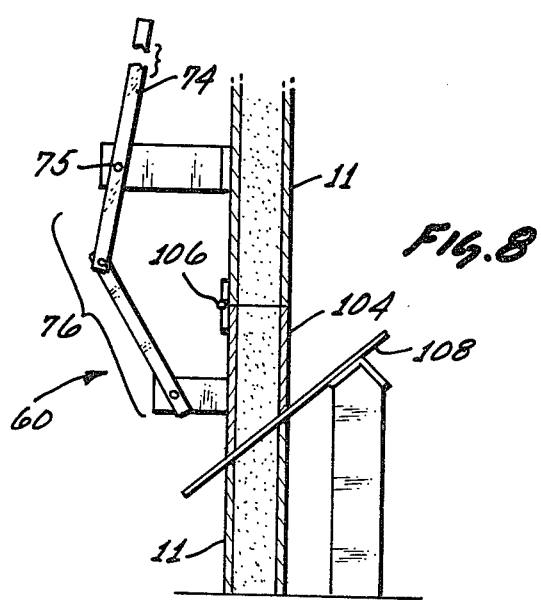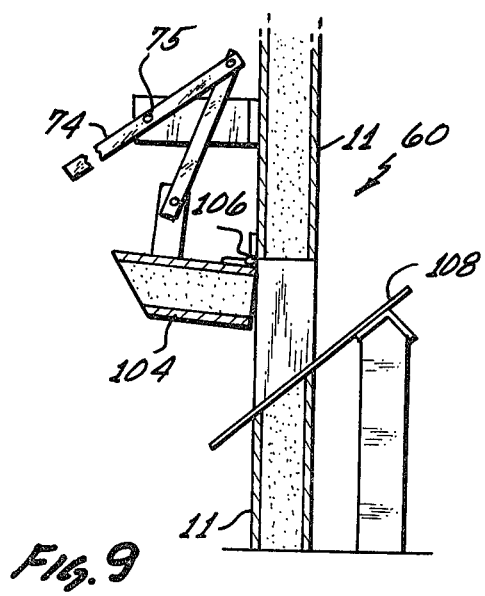

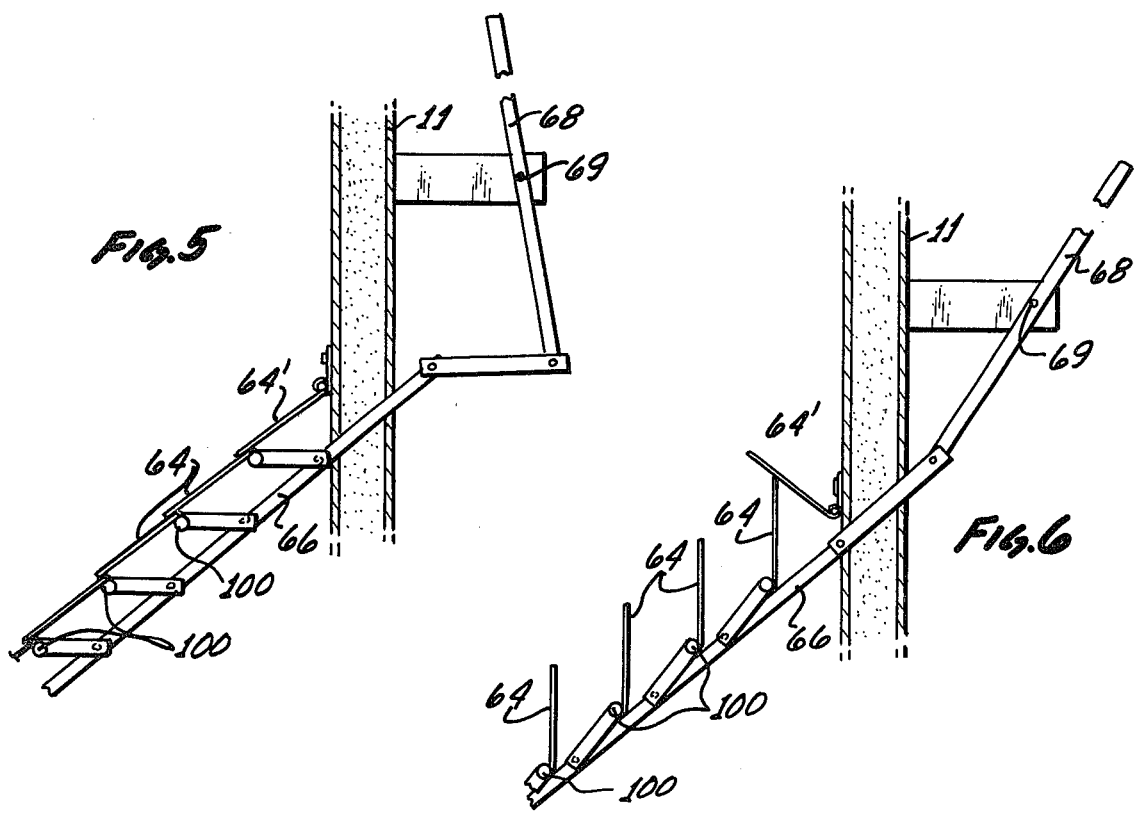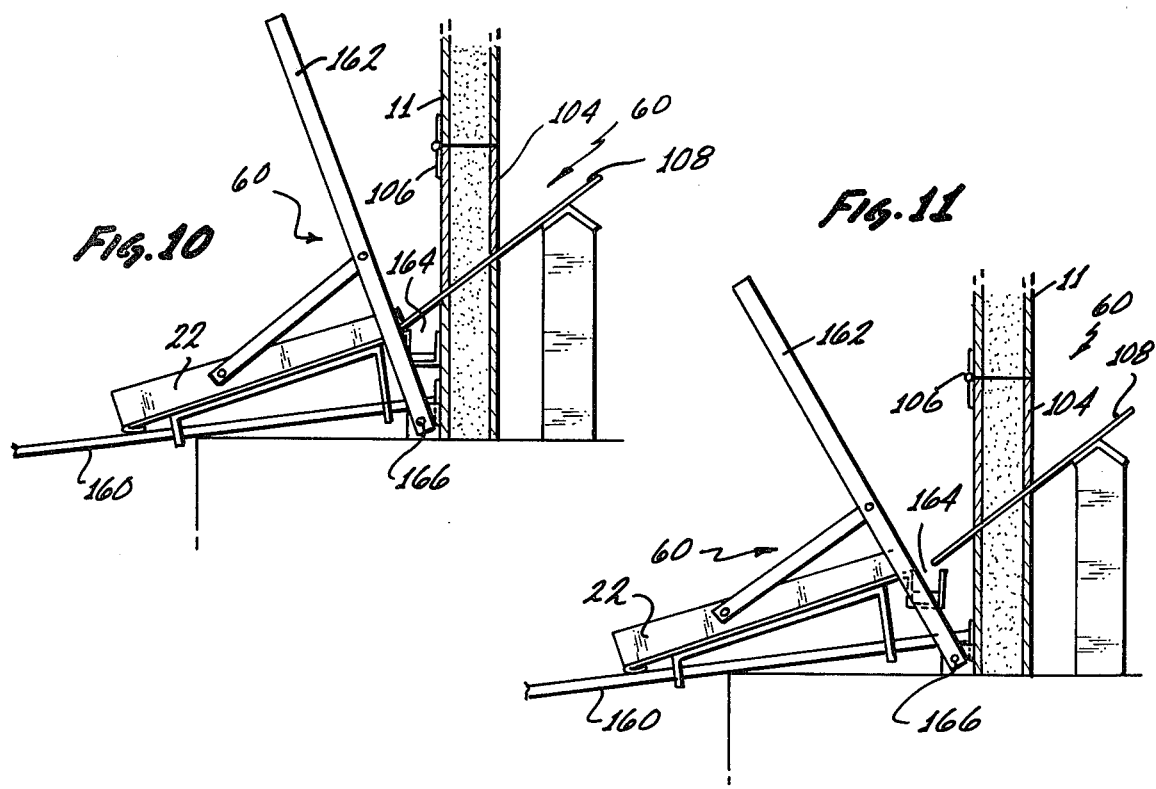

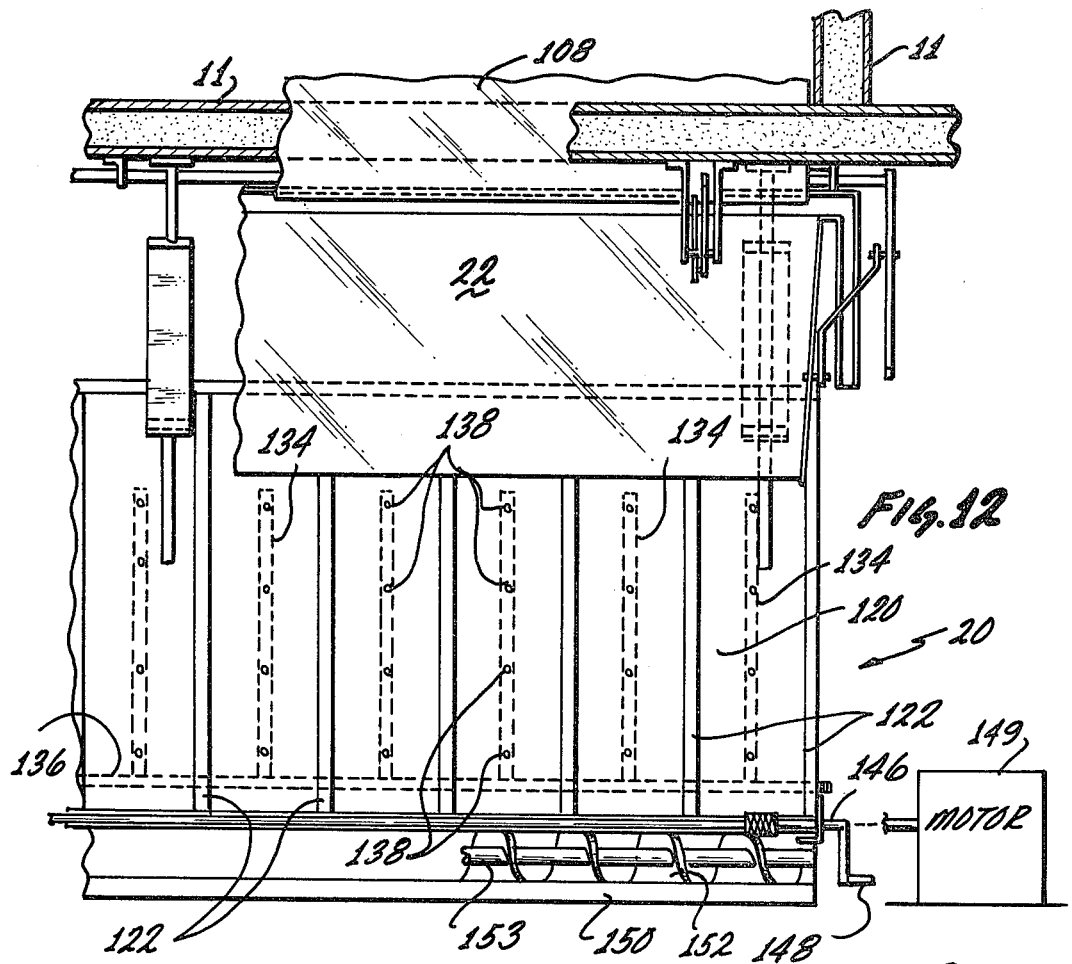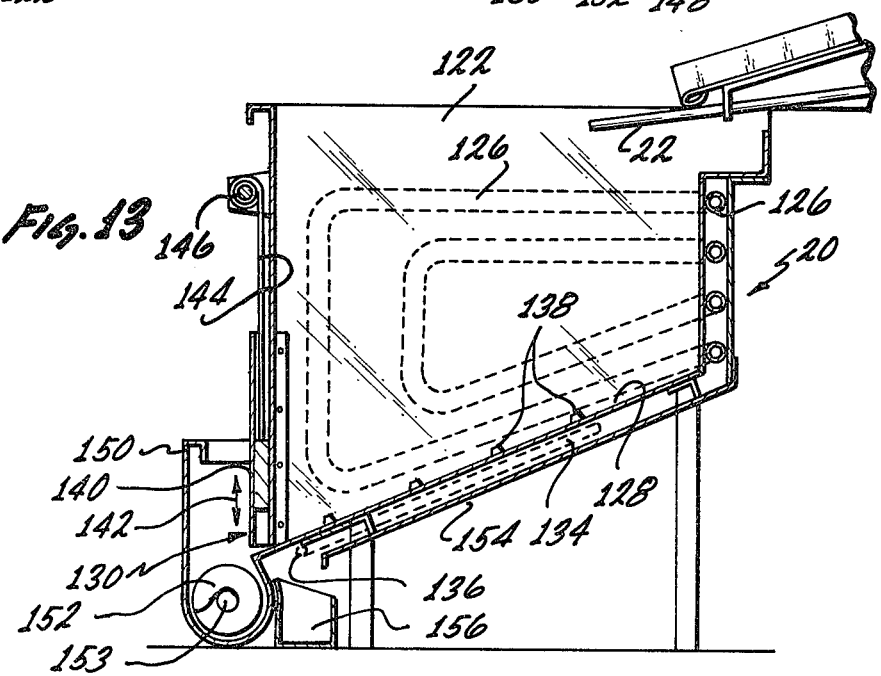

WET AND DRY ROASTING APPARATUS AND PROCESS FOR NUT, BEAN AND SEED-LIKE PRODUCT

BACKGROUND OF THE INVENTION

1. Field of Invention

The present invention relates to the preparation of food products in large quantities and more particularly relates to wet or dry apparatus and methods for roasting nut, bean and seed-like products.

2. Description of the Prior Art

In the past, small legumes and similar nut, bean and seed-like products, such as peanuts have been roasted in a process involving a single large, cylindrical cage or basket rotatable within an oven. The peanuts are deposited in large quantities in the cage, but usually only so much that the cage is only partially full. The cage is then rotated slowly as a roasting temperature on the order of 300 to 600 degrees Fahrenheit is maintained in the oven. Substances may be applied to the product, such as by spraying salt dextrose, molasses and the like onto the product while it is roasting, or perhaps while it is cooling.

The products are contained in the cage in such large quantities as they are roasting, that some of the products constantly remain toward the center of the cylindrical cage, while other products are situate toward the outer edges of the product pile. Obviously, the products at the outer extremities of the pile will receive more heat, and thus become more roasted than those toward the center of the pile, having a lesser surface exposed directly to the heat. Similarly, substances which may be applied onto the products in the cage or while the products are cooling, will coat or be applied more thickly on those products towards the outer extremities of the pile and closer to the spray than on those products at the center of the pile.

Another method for roasting such products requires conveyor means. Usually in a dry environment, the products are placed on a moving belt which travels a predetermined time through an oven. The timing of the travel and the temperature of the oven environment are coordinated to accomplish dry roasting. Additives may be sprayed or otherwise deposited on the product while it is situate on the belt.

Roasting ovens in the past have cooked the legumes. Still, it is desired to roast legumes in an apparatus and in a process which will produce a quantity of product having as uniform a degree of roasting or cooking as possible. Moreover, it is greatly desired, when roasting or cooking a large quantity of product where substances are to be added or applied, to produce a quantity of the product having as uniform an application of the added substance as is possible.

SUMMARY

In brief, in accordance with one aspect of the invention, a main oven portion has a port for receiving products. Prior to being deposited into the main oven portion, the products may be sorted, and additives, such as salt, dextrose and the like, may be added to the products as desired. The products may be contained in a slurry of water or other suitable liquid if desired, or may be dry. Hereinafter in this specification, the term "dry product" shall be used to indicate product not in such a liquid slurry, but which may have additives added to it.

In the oven, a main structure comprises eight cylindrical baskets or cages mounted so as to rotate about a center of the structure within the upper central portion of the oven. In this manner, the baskets or cages, and consequently the product therein contained are translationally moved as a unit through the air in the oven. Each cylindrical basket can be rotated into a position adjacent the port to receive the dry product or slurry. The port is opened sufficiently to allow the gates on the cages or baskets to open pivotally so that the outward edge of the openable cage door will abut a duct trough. The cage or basket door then becomes part of the duct for the product or slurry containing the product.

Each of the cylindrical baskets has a pivoted opening along a portion of its circumference and extending substantially the length of the cylindrical basket. The axis of rotation of the structure holding the cylindrical baskets is elevated above an inclined floor having louvered slats for opening the floor. When the floor is open, heat from gas burners underneath passes freely to the product. Alternatively, the louvers can be closed to create an inclined plane underneath the rotatable baskets so that substances, including slurry discharges and product released from the rotatable baskets will be directed by gravity to the lower end of the inclined plane. The product is directed to cooling bins positioned exteriorly of the oven. Slurry discharge is directed to waste disposal through a gutter. Moveable chute means is adjusted to channel the discharge appropriately. The oven comprises heating means for raising, lowering and maintaining predetermined temperatures within the oven for predetermined periods of time in accordance with a program.

A selectively openable gate or door in the oven's back, lower portion will allow the product to pass by gravity from the lower end of the inclined plane or false floor of the closed louvers. The door can be operated by a handle suitably attached to the door.

A chute on the backside of the oven, channels product to a particular cooling station comprising a plurality of bins, each having an inclined floor of its own for further material handling. Each bin is arranged with sidewalls having refrigeration coils therein. Suitable coolant is circulated through the refrigeration coils to control the temperature of the walls.

Air ducts are provided beneath the inclined floor of each bin. Each air duct has a plurality of openings to the floor of the cooling bin, through which openings air can be forced and injected through the floor of each bin. The air can then percolate through the collected product in the bin to the upper surface. The percolating air, in addition to cooling the product which is at a higher temperature, agitates the product within the bin to increase the exposure of the surfaces of the product to the side wall maintained at substantially lower temperatures by the refrigeration coils. Thus, the cooling system results in a synergism of the cooling effects of the refrigeration coils and of the air flow.

A door adjustable opening is provided in the back wall of the cooling bin adjacent to the lowest end of the inclined floor. After a predetermined cooling period with air percolation, the product can pass through an opened door into a channel. The channel is equipped with an auger or screw for moving the product linearly to an adjacent packaging bin, which is not described in the present specification. Preferably, this product channel has a floor shaped substantially cylindrically to complement the auger or screw rotatably mounted therein.

A separate, inclined floor beneath the floor of the cooling bin is provided to catch condensation caused by the refrigeration coils and the cold air in the air ducts. A condensation gutter is provided adjacent the product channel to drain suitably the condensed liquids separately.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is a prospective view of the preferred embodiment of the invention, showing a mixed chamber and a housing of an oven;

FIG. 2 is a side elevational, cross-section view of the oven and cooling chambers of the preferred embodiment of the invention;

FIG. 2A is a side-elevation of the oven of the preferred embodiment of the invention as seen in FIG. 2 having basket doors shown in the opened position;

FIG. 3 is a side elevational, cross-section of the oven chamber taken along line 3—3 of FIG. 2;

FIG. 4 is a prospective, partially cut-away view of a product basket of FIGS. 2 and 3;

FIG. 5 is a partial detail view of FIG. 2 showing portions of the louvered floor and operating handle in detail;

FIG. 6 is a partial detail view showing the louvered floor and operating handle of FIG. 5 in detail in an alternative position;

FIG. 7 is a detail view of the louvered floor of the preferred embodiment of the invention, showing portions cut-away for clarity;

FIG. 8 is a cross-section, side elevational detail view showing in detail the product exit door of FIG. 2 in the closed position;

FIG. 9 is a side elevation, cross-section detail view showing in detail the product door of FIG. 2 in the open position;

FIG. 10 is a side elevation, cross-section detail view showing the exit gate chute of FIG. 2 in detail in a first position;

FIG. 11 is a side elevational, cross-section detail view showing the exit gate chute, of FIG. 2 in detail in a second position;

FIG. 12 is a top view of the cooling bins of the preferred embodiment of the invention; and FIG. 13 is a cross-section, side elevational view of the cooling bins of FIG. 12.

DESCRIPTION OF THE PREFERRED EMBODIMENT

An improved roasting oven 10 receives product from a mixing chamber 12 gravitationally through a sluice duct 14 providing a guideway for the product such as nut, bean or seed-like product in a slurry, reference initially being had to FIG. 1 of the drawings. In this specification, the term "product" will be used to refer to nut, bean and seed-like products such as, for a limited example, coffee beans, peanuts, sunflower seeds, pumpkin seeds, nuts, popcorn and the like products.

The roasting oven 10 is constructed through two floors 16, 18, having an inclined evacuting chute 22 guiding the product to cooling bins 20. An intake gate or sluice port 24 opens the oven 10 to the lower half of sluice duct 14 for receiving product in slurry form from the mixing chamber 12. The mixing chamber 12 is supported on yet a third floor 26, and the sluice duct 14 has additional support 28.

Mixing chamber 12 comprises a substantially cylindrical container rotating about a center line axis. The mixing chamber 12 receives product, such as peanuts for example, in large quantities. Water or other liquid is added to the pile accumulated in mixing chamber 12 to form a slurry. The mixing blades of chamber 12 then are rotated so as to agitate or fully mix the product in the slurry liquid.

It may be desired to add to the product substances such as salt, oils, sugar, molasses and the like. Such additives are injected in the mixing chamber 12 and become part of the slurry. As the blades of chamber 12 are rotated, the additive becomes fully mixed with the product.

A sluice gate 28 is provided at the opening 30 of mixing chamber 12 so that when desired, the sluice gate 28 can be opened to allow the slurry containing the product and any additives combined therewith, to flow into the sluice duct 14. The mixing chamber 12 is of the type having helical fins or blades which continually move the product toward the closed end and back toward the open end by displacement. Suitable chambers are manufactured by Challenge-Cook Bros., Inc. of Industry, Calif.

Turning to FIGS. 2 and 3, the interior of the oven 10 can be seen in cross-section elevation. Eight baskets or cages 34 are mounted on a tree or structure 36 having crossed support beams 38 extending from a center 40.

Each basket 34 has a door opening 42 hinged to the basket. When the door 42 is closed, it comprises a portion of the circumferential surface of the basket. When the door 42 is opened on its pivotal hinge 44, the linear outer edge of the door abuts the lowest end of the sluice duct 14. The entire basket supporting structure 36 rotates about the center of rotation 40, the axle 41 being driven by upper pulley 48 mounted thereon. A chain belt 46 connects around upper pulley 48 and lower pulley 50. Lower pulley 50 is driven by a motor 52.

Each of the supporting beams 38 is mounted on axle 41 through circular disc 54. The cages or baskets 34 are held at their cylindrical ends to the beams 38. As shown, the axes 92 (FIG. 4) of the cylindrical baskets 34 are offset from their corresponding beams 38, so that the axis 92 of the basket 34 when it is nearest the opening 24, is above the plane defined by the beams 38.

The entire plurality of baskets 34 and their respective supporting structure 36 rotate in the direction of arrow 56 within the oven 10. The oven 10 is defined by a thermally insulative housing 11 which substantially defines a closed environment having only the openings as defined herein, together with such other openings as crawl holes conventionally used for interior service and the like.

The oven 10 has a false floor positioned at an incline having a lowest point near the evacuation opening 60. The false floor is comprised of a series of louvers 64 shown in FIGS. 2 and 3 as being closed. These louvers 64 are shown in their open position in FIG. 2 in phantom lines. The louvers 64 are connected to a common bus bar 66 which can be moved to open or to close the louvers by handle 68. The operation of the louvers will be explained in greater detail below.

Evacuation door 104 can be operated to open and to close in the direction of arrows 72 by manual maneuvering of handle 74. The operation of the evacuation door 104 will be explained in greater detail below.

The product when passed through opening 60 travels over chute 22 into cooling bins 80, shown only generally in FIG. 2. These cooling bins 80 will be explained in greater detail below. After processing in the cooling bins 80, the product is conveyed by an auger in trough or conduit 82 to packaging equipment.

Doors 42, when unsecured closed, will open by gravity, as seen in FIG. 2A. Products will fall downwardly during the descent into the lower elevation of the respective basket 34, onto the false floor formed by the closed louvers 64. The product will be guided by these closed louvers out through opening 60 through opened door 104.

The oven 10 also is comprised of a heating system having a heater 76 positioned under the inclined false floor. The heater 76 is an open flame, gas burning type having gas openings in pipe 78. The heater 76 is capable of elevating the temperature within the enclosed oven 10 to temperatures of between 200 and 600 degrees Fahrenheit for prescribed periods of time according to the novel process of roasting nuts, beans and seed-like products described in greater detail hereinbelow.

A basket or cage 34 is shown in greater detail in the partial cut-away view of FIG. 4. The basket 34 comprises a cylindrical surface 88 having end surfaces 90. The basket 34 is mounted between two channel beams 38 so that the axis 92 of the cylindrical surface 88 is offset therefrom. The surfaces 88, 90 are perforated so that liquids can pass therethrough, but the nut, bean or seed-like product being processed will be retained within the basket 34.

Each basket 34 has a door 42 hingedly connected to the cylindrical surface 88 at hinge 44. The surface of the door 42 is also perforated to allow liquids to pass therethrough while retaining the product being processed. The door 42 comprises side walls 94 to help channel the product slurry into and out of the basket 34. The door is secured in the closed position by securing angle beams 96 to each other. The angle beams 96 maintain the rigidity of lips of the door 42. An "L" shaped cross beam 39 connected across opposing beams 38, provides an anchor to which the hinge 44 is secured.

Baffles 97 (see also FIG. 2) are provided within the cages 34 to further assist in keeping the product in motion during the processing.

Turning to FIGS. 5 and 6, the operation of the false floor can be seen in greater detail. The false floor is created by a series of louvers 64 in the closed position as seen in FIG. 5. The louvers 64 are connected to a common bus 66 which is operated, through mechanical linkages, by handle 68. By pulling handle 68 away from wall 11, the mechanical linkage on the opposite side of the fulcrum 69 forces the bus 66 to extend downwardly, thus opening the louvers 64 to the position as seen in FIG. 6 of the drawings.

As seen in FIG. 6, when the louvers are opened the false floor is substantially eliminated. In the open position, the louvers 64 allow heat from heater 76 to rise unimpeded to the product in the baskets 34. When the louvers 64 are closed, the upper louver 64 in the inclined plane thus defined, overlaps the next adjacent and lower louver 64, as seen best in FIG. 7 of the drawings, to present an inclined floor inclining to a lowest point, on the back side of the oven adjacent to the evacuation opening 60, whose operations will be explained in greater detail below. Each louver 64 has slight sidewalls 98 to guide the product being roasted, and to prevent the product from falling to the floor 16 of oven 10. The louvers 64 pivot about axles 100. An upper louver 64' is hingedly connected to the interior of wall 11 to provide a continuing inclined extension of the false floor to the surface of the wall 11 when the louvers 64 are closed. When the louvers 64 are opened, the next adjacent louver 64 can force louver 64' into a position where it will present less of an obstruction to the heat being passed through the floor, as seen best in FIG. 6.

The evacuation opening 60 can be described in further detail, reference being had to FIGS. 8 and 9 of the drawings which show the evacuation opening 60 in an alternative position. The wall 11 is opened through insulated door 104 hingedly connected at hinge 106. A lower guideway or plate 108 connects directly with the lowermost louver of the false floor to complete the false floor and provide a path for the product to pass through the opening 60. The product is then passed over ramp or chute 22 into the cooling bins, which will be described in greater detail below.

The opening of door 104 is accomplished by moving the handle 74 about fulcrum 75 in the counterclockwise direction as seen in the drawings, FIGS. 8 and 9. When the handle 74 is pulled outwardly, the door 104 is pivoted about hinge 106 to open, as seen in FIG. 9. It may be noted that the linkage 76 between the handle 74 and the door 104 is of such length that when it is joined with that portion of handle 74 between the joint and the fulcrum 75, the sum of the distances is greater than the straight line distance between the fulcrum 75 and the door 104. This greater distance biases door 104 in the closed position.

In FIGS. 10 and 11, a special product chute and liquid drain apparatus is shown in alternative positions. In FIG. 10, chute 22, having side walls to provide a guideway for the product, is shown slideably mounted on rods 160. The movement of the chute can be manually accomplished by moving handle 162. The chute 22 is configured having a gutter 164 at the back end or end adjacent oven wall 11. Handle 162 is pivoted on axle 166.

In the position shown in FIG. 10, the side edge of the chute 22 is moved, by pushing handle 162 toward oven wall 11, into abutting connection with plate 108. Thus, when the door 104 is opened on its hinge 106, a guideway or continuous chute is provided from the inclined floor of the oven interior through the chute 22.

In the position shown in FIG. 11, the chute 22 is moved on rods 160 to the left (as seen in the drawing) by the movement of handle 162 away from the oven wall 11. By this action, the drain gutter 164 is positioned immediately below the lower edge of plate 108. Thus, when door 104 is opened on it hinge 106, liquids flowing down the inclined false floor of the oven interior will flow into the gutter 164, and will not pass along the chute 22.

Turning now to FIGS. 12 and 13, the cooling bins 20 will be described in greater detail. The chute 22 is brought into abutment with plate 108, in the position shown in FIG. 10. The chute 22 will then convey the product into the separate bins 120 which are separated by walls 122. The walls 122 are hollow sufficiently to contain refrigeration ducts or coils 126, shown partially in phantom lines in FIG. 13. The ducts 126 are pneumatically connected to a source of refrigerant material which is circulated through the ducts to maintain the temperatures of walls 122 at very cold levels. The walls 122 present a substantial surface area of contact with the surfaces of the products being processed.

Floor 128 of the cooling bins 120 is inclined so that its lowest level is adjacent a wall of the cooling bins having a sliding door opening 130. The floor has positioned thereunder pipes 134 conveying cooling fluids, such as compressed cold air. The pipes 134 are pneumatically connected to a source of such cold fluid through common pipe 136. Each pipe 134 has a plurality of pneumatic openings 138 into the cooling bins. As product is loaded into each of the cooling bins 120, the cold air can be percolated from the pipes 134 through the openings 138 and through the product loaded in the bins.

The opening 130 is created by sliding door 140 in the directions of arrow 142 upwardly and downwardly. The door is lifted by coiling the connecting wire 144 wrapped around handle axle 146. Cranking the handle 148, which is connected to the axle 146 will open and close the opening 130 by raising and lowering the door 140 in the direction of arrow 142.

When the door 140 is raised to open the cooling bins, the product gravitationally flows into a product trough 150, which is connected ultimately to the trough 82 feeding to the packaging stations. The trough 150 is equipped with an auger 152 which will advance the product along in the trough 150 in the direction desired the auger 152 can be rotated about axle 153 by connection to a rotary motor, not shown.

The compressed cold air being conveyed in pipes 134 will undoubtedly create condensate liquids by virtue of its immediate proximity to the very hot product resting in the cooling bins 120. Such condensate would defeat the purpose of processing if it were to be mixed with the product. In many instances, the product can be dehydrated in the cooling bins. Consequently, such condensate is collected along the second inclined floor 154, and directed gravitationally to condensate gutter 156. The moisture and water can then be directed safely away from the product being processed.

In operation, product is collected in mixing chamber 12. The product may be advanced through the system dry, but in many instances will be mixed with water or other liquid within mixing chamber 12 to form a slurry. Additives may be added in the mixing chamber to the product, whether dry or in slurry form.

When desired to advance the product into the oven, the port 24 can be then opened and the product guided into the oven through sluice duct 14.

The lower portion of sluice duct 14 can be manuevered to guide the product at any point in the lateral opening 24.

Baskets or cages 34 are rotated about axis 40 to position their openings or doors 42 to receive the lower end of the sluice duct 14. Product in the sluice duct, therefore, will be guided into the baskets 34. The doors 42 can be closed by swinging on hinge 44, and secured in the closed positon by securing angle beams 96 together.

When all of the baskets 34 are filled to approximately one-half, their volume, the door for opening 24 may be closed. The tree structures 38 can then be rotated about axis 40 operating motor 52 connected by pulley belt or chain 46.

If the product is in a slurry form when it is received in the baskets 34, the perforations in the basket will allow the liquid to drain to the bottom. The false floor formed by the closed louvers 64 will drain such liquid through the evacuation opening 60 in the back side of oven 10. Chute 22 can be manuevered away from plate 108 so that the evacuated liquids will pass into gutter 164, as shown in FIG. 11. After the liquid has been evacuated, handle 162 can be manuevered toward the wall 11, to abut chute 22 with plate 108, as seen in FIG. 10. In addition, the door 104 is closed along hinge 106 by rotating handle 74 in the clockwise direction as seen in FIGS. 8 and 9. The increased length of the linkages 76 will back bias door 104 in the closed position.

Interiorly, the louvers 64 are opened by operating handle 68 away from wall 11. Heat from open flame heating pipes 78 can then rise through the opened louvers to the upper portion of oven 10 where the baskets 34 contain the product. The temperature within the oven can be regulated by regulating the flow of gas in the heater 76 to temperatures desired for roasting the particular product. It is envisioned that such temperatures will be in the range of from 200 degrees to 600 degrees Fahrenheit and will be determined according to the product being roasted, and the techniques of the operator. The roasting can then be accomplished as the baskets rotate about center of rotation 40 in the direction of arrow 56 while heat is applied.

The baskets 34 are maintained in spaced relation to each other by the structure 38. Further, as the structure 38 rotates, each basket is moved as a unit translationally through the closed environment formed by the oven 10. This translational movement provides a more even distribution of heated air to the product loaded in each container, so that the product more toward the interior of each basket will likely receive comparably similar air contact as the product more toward the outsides of the container.

The heated air can be evacuated through, for example opening 24 to cool rapidly the oven air. When the heated air is so evacuated from the oven 10 in accordance with roasting techniques, the continued rotation of the structure 38 provides more thorough "saturation" of the air at the new temperature to all the product including that more toward the interior of the loaded baskets.

At the conclusion of the heating segment, the louvers 64 are closed by maneuvering handle 68 toward wall 11. In the manner, a false floor is created separating the heater 76 from the upper portion of the oven. The door 104 is opened by maneuvering handle 74 away from wall 11. At this time, the doors 42 may be opened as the baskets are rotated about axis 40. The door will gravitationally remain open as the basket rotates to the lowermost elevation, emptying the product onto the false floor. As each basket is rotated to the lowermost elevation, its contents are likewise emptied.

The false floor guides the product to the back side of the oven, and through opening 60 onto chute 22. Chute 22 guides the product into cooling bins 80, where the product is separated and loaded into a plurality of individual bins 120.

The side walls of 122 of bins 120 are maintained at very cold temperatures by refrigerant in coils 126 within the hollow side walls 122. In addition, cold air is forced upwardly from the floor 128 through openings 138. The combination of exposure of the product surfaces to the side wall surface maintained at a cold temperature, and of the cold air percolating through the loaded bins provide rapid and all-encompassing cooling of the product. After a predetermined cooling period, sliding door 140 is opened by winding its supporting or connecting wires 144 around handle axle 146. Axle 146 can be operated by handle 148, or in the alternative may be connected to drive motor 149. The loaded bins 120 then empty their product through the opening 130 into trough 150. Trough 150 is provided with an auger 152 to manuever the product through the trough and on to packaging stations, where the product can be packaged in a suitable manner.

Summarizing, it may be seen that an oven and cooling apparatus for roasting nut, bean and seed-like product is provided where the product is contained together in discrete units or batches and translationally moved as units through the heated air in the oven to provide more rapid roasting of the product. Moreover, the heated air is more evenly distributed to the surfaces of the product throughout each unit or batch by such translational movement. The product may be received with water in a slurry, and have the slurry water drained from the product by guide means in the form of a false floor. During the roasting process, the false floor can eliminated by raising louvers to vent heat from heater vertically through the product contained in units or batches within the oven environment. After the roasting process, the product is evacuated by the same guide means to a cooling system including refrigeration coils within the side walls of cooling bins. Cool air can be percolated from underneath these loaded bins to distribute the cold air from the side walls, and to carry off the heat of the individual product. By this roasting oven and cooling apparatus, not only the heated air but also the cooling air is more rapidly and evenly distributed throughout the batches or units of product.

The foregoing detailed description is illustrative of several embodiments of the invention. It is to be understood, however, that additional embodiments will be perceived by those skilled in the art. The embodiments described herein, together with those additional embodiments are considered to be within the scope of the present invention.

We claim:

1. Container means for holding a quantity of nut, bean and seed-like product while said product is roasted by heated air at roasting temperatures, comprising:
   a. a plurality of containers having perforations for draining treated and untreated liquids from said product and for allowing said air at said roasting temperatures to pass through, but capable of holding a quantity of said product, each said container being rotatable about a center of rotation and being substantially cylindrical and having a generally horizontal axis;
   b. container moving means for interconnecting said containers and for providing translational movement of said container through the heated air thereabout; and
   c. a container discharge means for discharging the product including; a hinged door comprising part of the surface area along substantially the length of said containers, and comprising latch means for securing each of said doors shut, each of said doors being openable by gravity when said latch means is unsecured and said container is rotated to a position where the door occupies the lower portion of the cylindrical container so as to allow said product to evacuate.

2. A roasting oven and cooling apparatus, comprising:
   a. at least one rotatable container having a lowermost surface area when rotated and having perforations for draining treated and untreated liquids and capable of holding a quantity of nut, bean and seed-like product and comprising an openable door selectively positioned at said lower-most surface area of said container as said container rotates and including means, when engaged, for securing said door shut;
   b. a closed environment completely enclosing said rotatable container, having means for separately and gravitationally evacuating liquid and for separately and gravitationally evacuating said product, and further having means for receiving said product;
   c. means within said closed environment for heating and cooling said environment at predetermined times;
   d. container moving means for providing translational movement of said container through the air within said closed environment, said door being opened selectively by gravity when said securing means is not engaged and said door is in said lower-most surface area of said container to thereby evacuate by gravity all product from said container; and
   e. cooling means in connection with said closed environment for receiving said product from said means for separately and gravitationally evacuating said product.

3. The roasting oven and cooling apparatus of claim 2, wherein said means for receiving said product comprises means for receiving said product in a liquid slurry.

4. The roasting oven and cooling apparatus of claim 2 wherein said cooling means comprises means selectively operable to percolate cold air through said product received from said closed environment, for displacing heat held by said product.

5. The roasting oven and cooling apparatus of claim 4 wherein said cooling means further comprises side walls containing said received nut product and having means for maintaining said sidewalls at refrigerated temperatures.

6. The roasting oven and cooling apparatus of claim 5 wherein said means for maintaining said sidewalls at refrigerated temperatures includes pneumatic coils positioned adjacent said sidewalls and supplied with refrigerant fluids.

7. The roasting oven and cooling apparatus of claim 2 further including a plurality of said rotatable containers, wherein said containers are mounted at the extremity of a structure having a center of rotation about which all said containers are rotated, and further including means for rotating said structure and said plurality of containers about said center of rotation.

8. The roasting oven and cooling apparatus of claim 7 wherein said center of rotation is horizontally oriented so that during a cycle of rotation, said containers pass through a lower elevation and successively a higher elevation, and wherein each of said rotatable container doors is positioned at a surface of said container substantially at the furtherest distance from said center of rotation, said door being maintained selectively in an opened state by gravity during its pass through said lower elevation to evacuate by gravity all product from said container.

9. A roasting oven and cooling apparatus, comprising:
   a. at least one rotatable container having perforations for draining treated and untreated liquids and capable of holding a quantity of nut, bean and seed-like product;
   b. a closed environment completely enclosing said rotatable container, having means for separately and gravitationally evacuating liquid and for separately and gravitationally evacuating said product, said means comprising guidemeans positioned within said closed environment below said at least one rotatable container and having at least two operational modes, said guidemeans being selectively operable to provide in one mode of operation a guideway for said product and for said liquid substantially to a side of said enclosed environment defining a vector of movement of said product and said liquid in downward and horizontal directions, and selectively operable to provide in a second mode of operation a passage for heat energy vertically through said guidemeans such that heat from said heating means within said closed environment may pass through said guidemeans to said at least one rotatable container, and further having means for receiving said product;
   c. means within said closed environment for heating and cooling said environment at predetermined times;
   d. container moving means for providing translational movement of said container through the air within said closed environment; and
   e. cooling means in connection with said closed environment for receiving said product from said means for separately and gravitationally evacuating said product.

10. The roasting oven and cooling apparatus of claim 9 wherein said means for receiving said product comprises means for receiving said product in a liquid slurry, and wherein further said guidemeans in said first mode of operation provides gravitational evacuation of said liquid substantially to the side of said enclosed environment.

* * * * *